United States Patent
Meenakshisundaram et al.

(10) Patent No.: US 7,924,929 B2
(45) Date of Patent: Apr. 12, 2011

(54) METHOD OF AUTOMATICALLY TESTING AUDIO-VIDEO SYNCHRONIZATION

(75) Inventors: Ramanathan Meenakshisundaram, Ossining, NY (US); Murali Mani, Chappaqua, NY (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1427 days.

(21) Appl. No.: 10/536,645

(22) PCT Filed: Nov. 26, 2003

(86) PCT No.: PCT/IB03/05457
§ 371 (c)(1),
(2), (4) Date: May 27, 2005

(87) PCT Pub. No.: WO2004/052021
PCT Pub. Date: Jun. 17, 2004

(65) Prior Publication Data
US 2006/0098742 A1    May 11, 2006

Related U.S. Application Data

(60) Provisional application No. 60/430,917, filed on Dec. 4, 2002.

(51) Int. Cl.
*H04B 1/66* (2006.01)
(52) U.S. Cl. ......... 375/240.28; 375/240.25; 375/240.26; 375/240.27; 382/233; 382/235; 704/500; 704/503
(58) Field of Classification Search .......... 375/240.28, 375/240.25, 240.26, 240.27; 382/233, 235; 704/500, 503
See application file for complete search history.

(56) References Cited

U.S. PATENT DOCUMENTS

| 5,502,573 | A | * | 3/1996 | Fujinami | .......... 386/65 |
| 5,559,999 | A | * | 9/1996 | Maturi et al. | .......... 713/400 |
| 5,758,011 | A | | 5/1998 | Fujinami | |
| 6,188,731 | B1 | | 2/2001 | Kim | |

FOREIGN PATENT DOCUMENTS

| EP | 0948206 A2 | 4/1999 |
| EP | 1071290 A2 | 7/2000 |
| JP | 07-177479 | 7/1995 |
| JP | 08-046884 | 2/1996 |
| JP | 10-051750 | 2/1998 |
| JP | 2001-078185 | 3/2001 |

(Continued)

OTHER PUBLICATIONS

Fibush, D.K.: "Timing and synchronization using MPEG-2 transport streams", SMPTE Journal, Jul. 1, 1996, pp. 395-400, XP000597142, ISSN: 0036-1682.

(Continued)

*Primary Examiner* — Shawn An
(74) *Attorney, Agent, or Firm* — DLA Piper LLP (US)

(57) ABSTRACT

A method of testing audio/video synchronization comprising calculating a frequency of a device used to encode a digital stream based on program clock references calculating first time differences between audio decoding time stamps and actual audio decoding times; calculating second time differences between audio presentation time stamps and actual audio presentation times; calculating third time differences between video decoding time stamps and 4 actual video decoding times; and calculating fourth time differences between video presentation time stamps and actual video presentation times.

15 Claims, 6 Drawing Sheets

FOREIGN PATENT DOCUMENTS

KR    2000-0055875    9/2000

OTHER PUBLICATIONS

Fibush, D.K.: "Testing Multimedia transmission systems", Nov. 29, 2009, pp. 34-44.

Settle, Timothy F., et al.: "Digital bit stream generator for testing MPEG video decoders", IEEE Transactions on consumer electronics, IEEE Inc., New York, US, vol. 42, No. 3, Aug. 1, 1996, pp. 422-430, XP000638522, ISSN: 0098-3063, abstract, paragraphs '02.1!', '03.1!', figure 3.

Lu, G.J. et al.: "Mechanisms of MPEG stream synchronization", Computer communication review, association for computing machinery, New York, US, vol. 24, No. 1, 1994, pp. 57-67, XP0005600498, ISSN: 0146-4833, paragraphs '0003!', '0004!', figure 2.

JP Patent Appl. No. 2004-556656, Notification of Reason for Rejection, mailed Dec. 4, 2009 (English and Japanese translations).

\* cited by examiner

METHOD OF AUTOMATICALLY TESTING AUDIO-VIDEO SYNCHRONIZATION

CROSS REFERENCE TO RELATED CASES

Applicants claim the benefit of Provisional Application Ser. No. 60/430,917, filed Dec. 4, 2002.

The present invention relates to the field of digital signal processing, more specifically, it relates to a method for testing audio/video synchronization (AVsync) in receiver hardware, software, hardware/software combinations and is readily extendable to testing the digital signals themselves.

The Moving Pictures Expert Group (MPEG) standard is a digital audio/video (A/V) compression standard employed in a variety of A/V distribution systems including, for example, Digital Satellite System (DSS) broadcasting, Digital Cable broadcasting and Digital terrestrial broadcasting. At the receiving end, the compressed A/V digital streams have to be uncompressed and decoded. The MPEG standard provides fields such as program clock reference (PCR), presentation time stamp (PTS), decode time stamp (DTS) and system time clock (STC) (of the MPEG encoder). The PCR bears a strict relationship to the STC within the MPEG encoder that generates the broadcast stream, and therefore may be employed to replicate the encoder's time clock at the decoder's end. The DTS's are used by the decoders to determine when an audio unit or video frame is to be decoded and the PTS's are used to determine when the decoded audio unit or video frame is to be presented. It is critical that the audio and video data be both decoded and presented in proper AVsync.

When a receiver system (hardware, software or both) is designed, it must be tested to ensure that AVsync performance of the system complies with the MPEG standard. Currently, testing requires a human being to observe a video clip and, listen to the accompanying audio and make a subjective determination of acceptable AVsync. This is very labor intensive, not very accurate and not very precise.

A more precise testing adds a flash to the video and a beep to the audio and an oscilloscope is used to measure the AVsync. This still requires a human observer as well as a special test signal, and the accuracy and precision is dependent upon the skill of the oscilloscope operator and the calibration of the oscilloscope. Further, long term testing requires periodic human intervention for adjustment of the oscilloscope.

These two test methods are labor intensive and thus expensive, and do not provide the required accuracy or repeatability needed for quick debug of AVsync problems, so repeated testing is often necessary.

Therefore, there is a need for a non-subjective, highly precise and highly repeatable method of AVsync testing that is inexpensive and stable over prolonged test times.

A first aspect of the present invention is a method of testing audio/video synchronization of a decoder device for receiving a digital stream, the digital stream containing system time clock fields, program clock reference fields, audio decoding time stamp fields, audio presentation time stamp fields, video decoding time stamp fields and video presentation time stamp fields, comprising: recovering at least two sequential program clock references from the program clock reference fields; calculating a frequency of a device used to encode the digital stream based on the sequential program clock references and decoder time stamps of when the sequential program clock references were recovered; generating an audio elementary stream and a video elementary stream from the digital stream; recovering from the audio elementary stream at least one audio decoding time stamp from the audio decoding time stamp fields and calculating a first time difference between the audio decoding time stamp and a first decoder time stamp of when an audio unit corresponding to the audio decoding time stamp was decoded; recovering from the audio elementary stream at least one audio presentation time stamp from the audio presentation time stamp fields and calculating a second time difference between the audio presentation time stamp and a second decoder time stamp of when an audio unit corresponding to the audio presentation time stamp was presented; recovering from the video elementary stream at least one video decoding time stamp from the video decoding time stamp fields and calculating a third time difference between the video decoding time stamp and a third decoder time stamp of when a video frame corresponding to the video decoding time stamp was decoded; and recovering from the video elementary stream at least one video presentation time stamp from the video presentation time stamp fields and calculating a fourth time difference between the video presentation time stamp and a fourth decoder time stamp of when the a video frame corresponding to the video presentation time stamp was presented.

A second aspect of the present invention is a method of testing audio/video synchronization of a decoder device under test, the decoder device receiving a digital stream, the digital stream containing system time clock fields, program clock reference fields, audio decoding time stamp fields, audio presentation time stamp fields, video decoding time stamp fields and video presentation time stamp fields, comprising: providing a frequency extractor module in a de-multiplexer of the decoder device, the frequency extractor module adapted to recover at least two sequential program clock references from the program clock reference fields; calculating a frequency of a device used to encode the digital stream based on the sequential program clock references and decoder time stamps of when the sequential program clock references were recovered; generating an audio elementary stream and a video elementary stream from the digital stream; providing an audio delta calculator module in an audio decoder, the audio delta calculator module adapted to recover from the audio elementary stream at least one audio decoding time stamp from the audio decoding time stamp fields and adapted to calculate a first time difference between the audio decoding time stamp and a first decoder time stamp of when an audio unit corresponding to the audio decoding time stamp was decoded and adapted to recover from the audio elementary stream at least one audio presentation time stamp from the audio presentation time stamp fields and adapted to calculate a second time difference between the audio presentation time stamp and a second decoder time stamp of when the audio unit corresponding to the audio presentation time stamp was presented; and providing a video delta calculator module, the video delta calculator adapted to recover from the video elementary stream at least one video decoding time stamp from the video decoding time stamp fields and adapted to calculate a third time difference between the video decoding time stamp and a third decoder time stamp of when a video frame corresponding to the video decoding time stamp was decoded and adapted to recover from the video elementary stream at least one video presentation time stamp from the video presentation time stamp fields and adapted to calculate a fourth time difference between the video presentation time stamp and a fourth decoder time stamp of when the video frame corresponding to the audio presentation time stamp was presented A third aspect of the present invention is a method of testing audio/video synchronization in a digital stream, the digital stream containing system time clock fields, program clock reference fields, audio decoding time stamp fields, audio presentation time stamp fields, video decoding time stamp fields and video presentation time stamp fields, comprising: receiving the digital stream in a decoder device having a known degree of audio/video synchronization; recovering at least two sequential program clock references from the program clock reference fields; calculating a frequency of a device used to encode the digital stream based on the sequential program clock references and decoder time stamps of when the sequential program clock references were recovered; generating an audio elementary stream and a video elementary stream from the digital stream; recovering from the audio elementary stream at least one audio decoding time stamp from the audio decoding time stamp fields and calculating a first time difference between the audio decoding time stamp and a first decoder time stamp of when an audio unit corresponding to the audio decoding time stamp was decoded; recovering from the audio elementary stream at least one audio presentation time stamp from the audio presentation time stamp fields and calculating a second time difference between the audio presentation time stamp and a second decoder time stamp of when the audio unit corresponding to the audio presentation time stamp was presented; recovering from the video elementary stream at least one video decoding time stamp from the video decoding time stamp fields and calculating a third time difference between the video decoding time stamp and a third decoder time stamp of when a video frame corresponding to the video decoding time stamp was decoded; and recovering from the video elementary stream at least one video presentation time stamp from the video presentation time stamp fields and calculating a fourth time difference between the video presentation time stamp and a fourth decoder time stamp of when the video frame corresponding to the audio presentation time stamp was presented.

The features of the invention are set forth in the appended claims. The invention itself, however, will be best understood by reference to the following detailed description of an illustrative embodiment when read in conjunction with the accompanying drawings, wherein:

The term and data structures of MPEG are used in describing the present invention. It should be understood that the term MPEG may be replaced by MPEG-1, MPEG-2, MPEG-4, MPEG-7, digital satellite system (DSS) data structures or other standards that share common digital stream structures with or are built upon the MPEG standard. Further, the term MPEG is intended to cover all these aforementioned standards.

The invention is applicable to any product utilizing any of the above data structures or standards including, but not limited to, digital and hybrid television, digital video disk players, MPEG players and set top boxes.

However, the invention will be described for a MPEG receiver, receiving an MPEG encoded signal.

Figure 1:
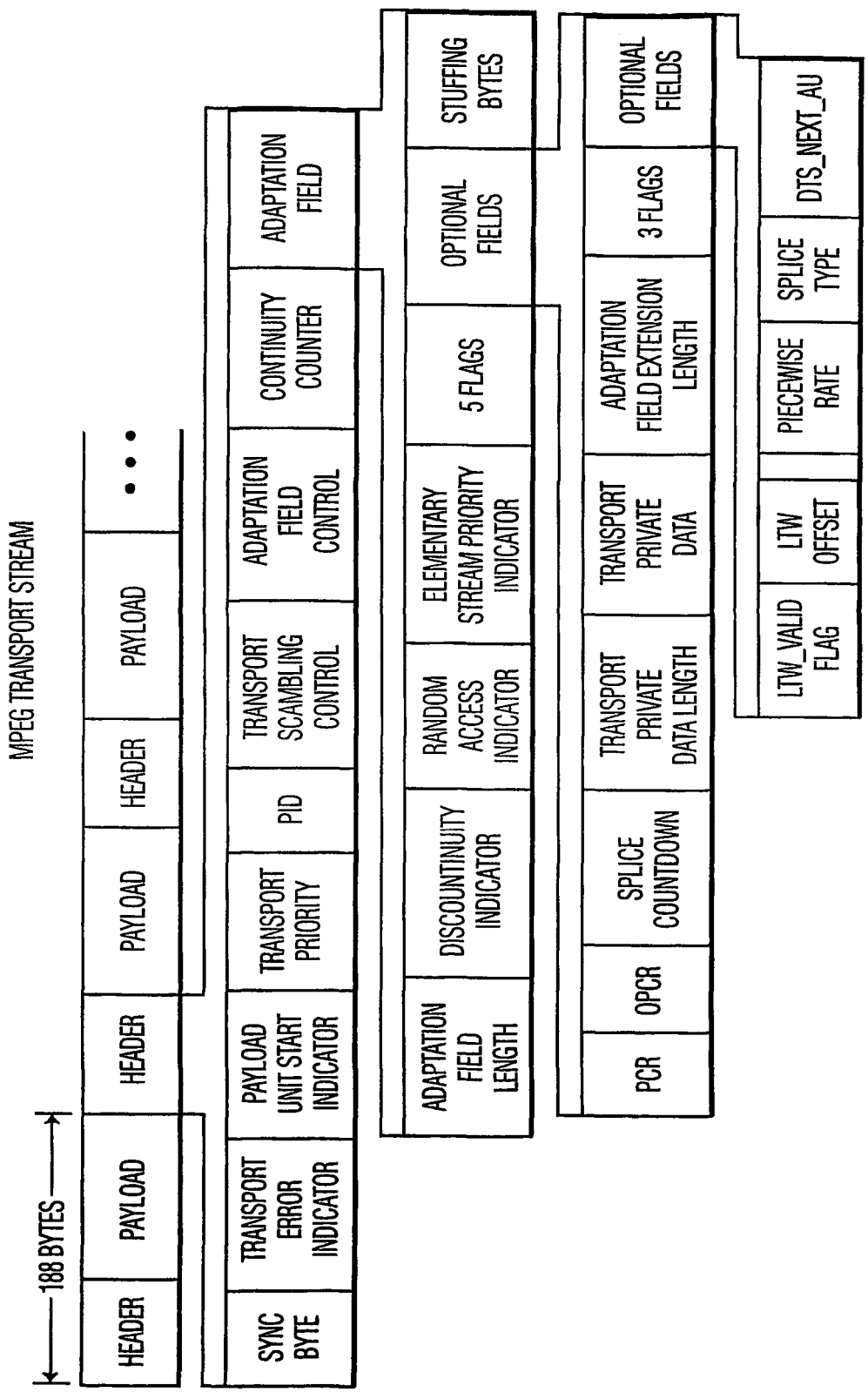
FIG. 1 is a schematic diagram of the data structure of an MPEG transport stream.
Figure 2:
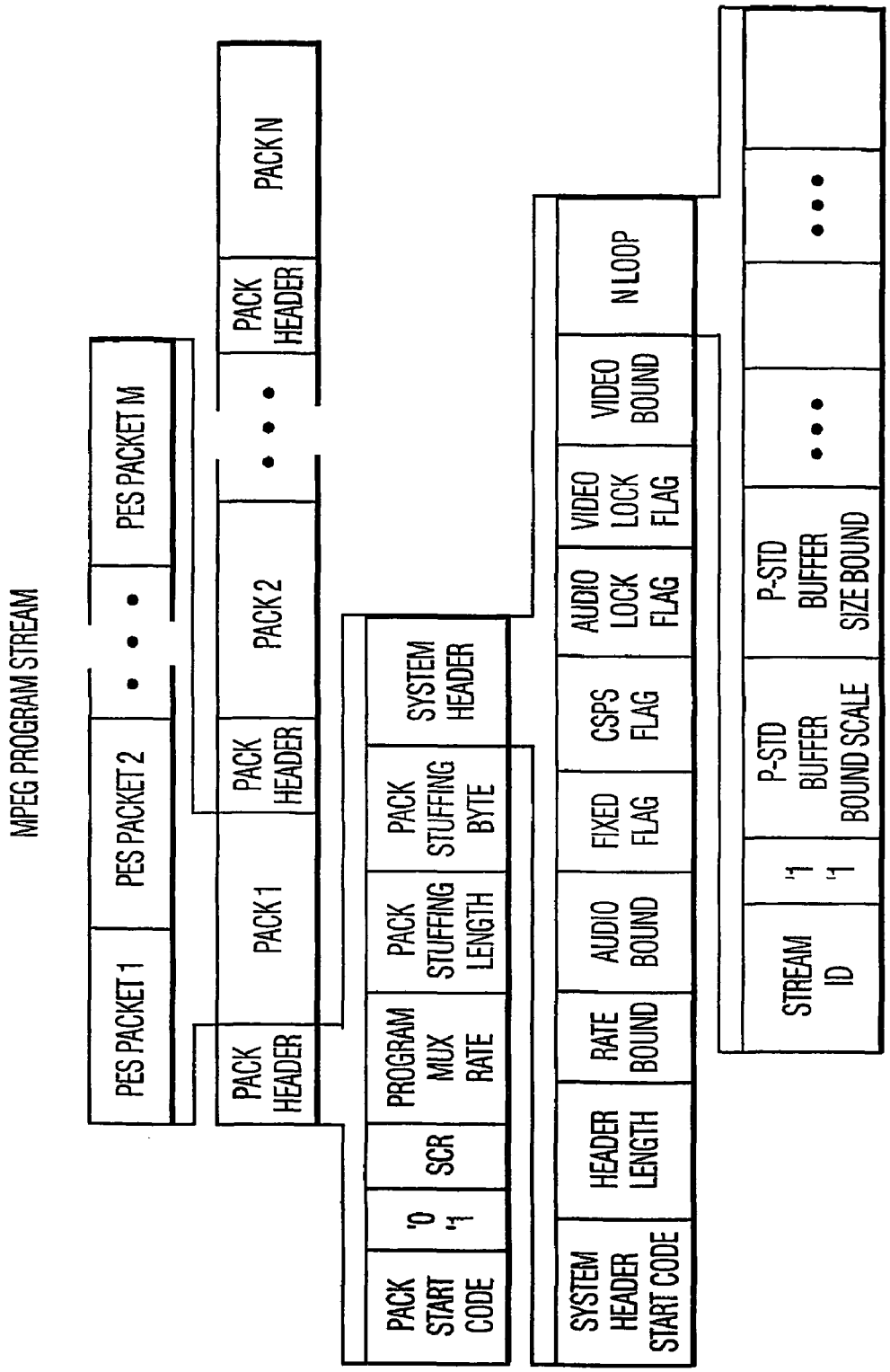
FIG. 2 is a schematic diagram of the data structure of an MPEG program stream.
Figure 3:
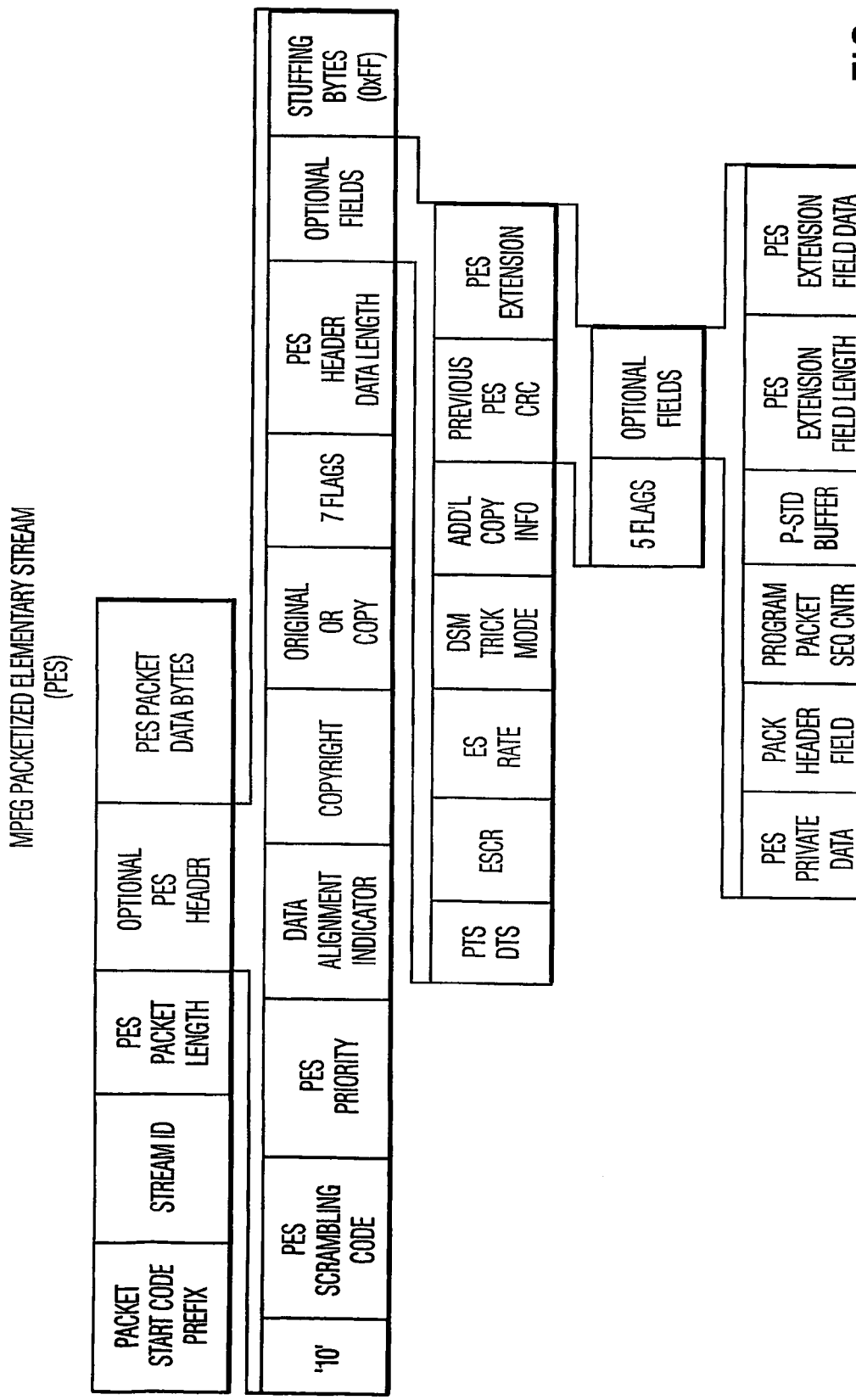
FIG. 3 is a schematic diagram of the data structure of an MPEG packetized elementary stream.

FIGS. 1 through 3 are provided as an aid to understanding the present invention and merely illustrate the MPEG standard digital stream structure.

FIG. 1 is a schematic diagram of the data structure of an MPEG transport stream. A transport stream carries multiple programs. A transport stream is comprised of multiple 188 byte units, each which includes a header and a payload. Headers are divided into the following fields: a sync byte field, a transport error indicator field, a payload unit start indicator field, a transport priority field, a packet ID (PID) field, a transport scrambling control field, an adaptation field control field, a continuity counter field and adaptation field. The PID field are of especial interest for the present invention.

The adaptation field is further divided into the following fields: an adaptation field length field, a discontinuity counter field, a random access indicator field, an elementary stream priority indicator field, a field of 5 flags pointing to an optional fields field and a stuffing bytes field.

The optional fields field is further divided into a program clock reference (PCR) field, a old program clock reference field (OPCR) a splice counter field, a transport private data length field, a transport private data field, an adaptation field extension length field and a field of three flags pointing to an optional fields field. The PCR field is of especial interest for the present invention.

The optional fields field is further divided into fields as illustrated in FIG. 1.

Each payload generally contains data in the form of pieces of packetized elementary streams (PES). However, data in other data formats may be packed into a payload. Video, audio, entitlement management message and entitlement control message data is always packed in PES format. The data structure of an MPEG PES stream is illustrated in FIG. 3 and described infra.

FIG. 2 is a schematic diagram of the data structure of an MPEG program stream. A program stream is a variable length structure composed of multiple packs, each pack is divided into a pack header and one or more PES packets. A program stream carries only one program. The data structure of an MPEG PES stream is illustrated in FIG. 3 and described infra. Pack headers are divided in the following fields: a pack start code field, a "01" field, an system clock reference (SCR) field, a program MUX rate field, a pack stuffing length field, a pack stuffing byte field and a system header field.

The system header field is further divided into a system header start code field, a header length field, a rate bound field, an audio bound field, a fixed flag field, a CSPS fag, a video bound field and an N loop field.

The N loop field is further divided into a stream ID field, a "11" field, a P-std buffer bound scale field, a P-std buffer size bound field, and other fields.

FIG. 3 is a schematic diagram of the data structure of an MPEG packetized elementary stream (PES). A PES stream is a variable length structure composed of a packet start code prefix field, a stream ID field, a PES packet length field, an optional PES header field and a field for the actual PES packet data. The optional PES header field is divided and sub-divided as illustrated in FIG. 3. The PTS/DTS filed of the optional field of the optional PES header filed is of especial interest to the present invention.

Figure 4:
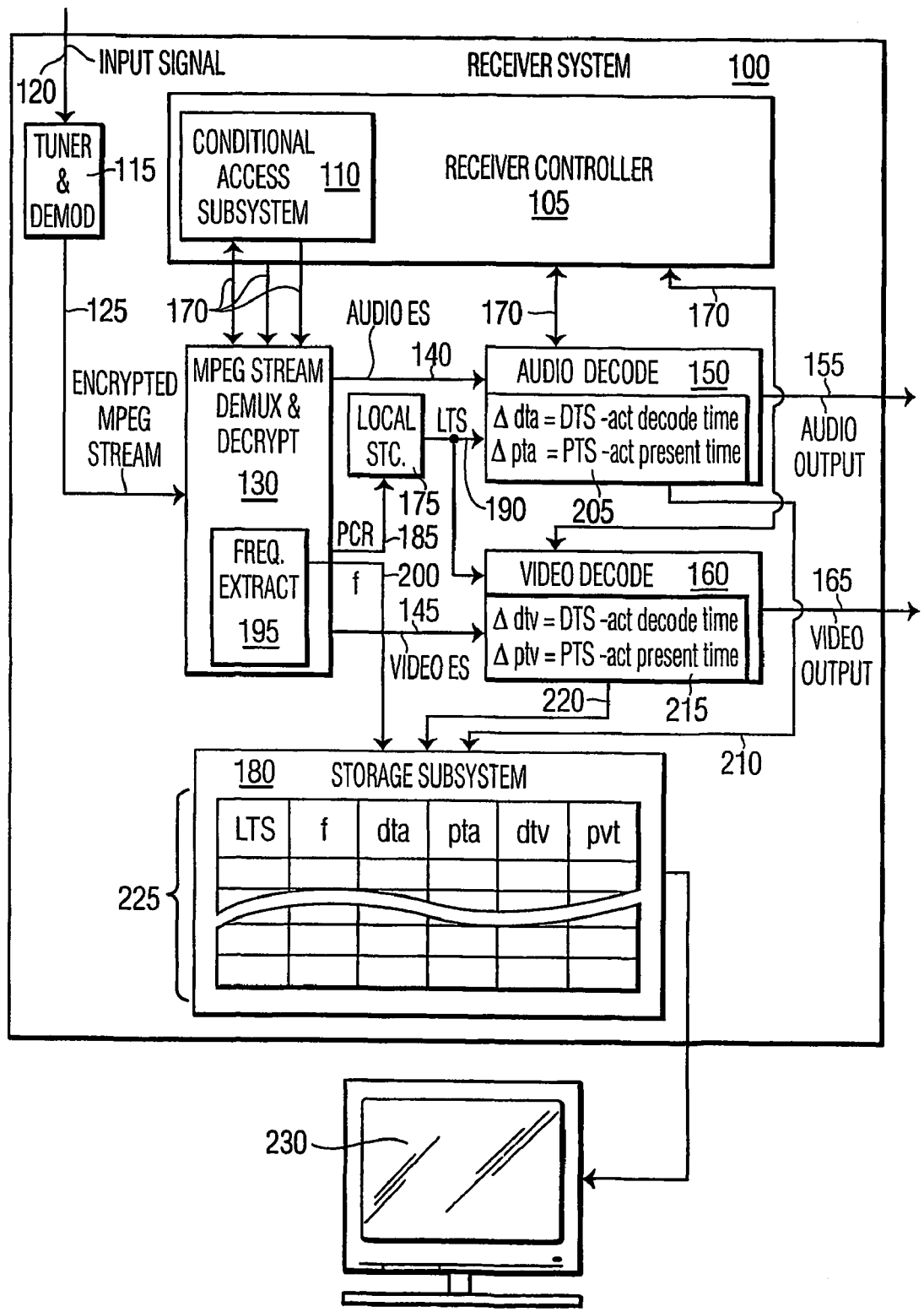
FIG. 4 is a schematic block diagram of an exemplary system according to the present invention.

FIG. 4 is a schematic block diagram of an exemplary system according to the present invention. In FIG. 4, receiver 100 includes a receiver controller 105 containing a conditional access subsystem 110 and a tuner and demodulator 115 for receiving a modulated MPEG stream 120 (a digital stream) and passing an encrypted MPEG stream 125 to a MPEG stream de-multiplexer and decryptor 130. Conditional access subsystem 110 includes the functions for providing decryption support to MPEG stream de-multiplexer and decryptor 130. Conditional access subsystem 110 is optional and is only required when modulated MPEG stream 120 is encrypted. Similarly, MPEG stream de-multiplexer and decryptor 130 need have decrypting capability only if modulated MPEG stream 120 is encrypted. MPEG de-multiplexer and decryptor 130 converts transport stream 125 into an audio elementary stream (ES) 140 and a video ES stream 145.

An audio decoder 150 receives audio elementary stream 140 and converts the audio ES into playable audio output 155. A video decoder 160 receives video ES streams 145 converts the video ES to playable video output 165. Both audio output 155 and video output 165 are suitable for use by normal television, audio and/or computer equipment A variety of control signals 170 are sent by receiver controller 105 (or conditional access subsystem 110) to MPEG de-multiplexer and decryptor 130, audio decoder 155 and video decoder 160 to control and coordinate the operations of the MPEG de-multiplexer and decryptor and the audio and video decoders.

Receiver 100 further includes a local system time clock (STC) 175 and a storage subsystem 180. Storage subsystem 180 may comprise storage media such as hard disks, re-writable CD drives, re-writable DVD drives, semiconductor storage or even tape.

Local STC 175 receives a recovered PCR signal 185 from MPEG stream de-multiplexer and decryptor 130 and generates a local time signal (LTS) 190. LTS 190 is provided to audio decoder 155 and video decoder 160. PCR signal 185 is a stream of PCR's recovered from the PCR field in the MPEG transport stream as illustrated in FIG. 1.

There are five measures of AVsync. The first measure is the frequency of decoder STC 175. The frequency of the encoder STC (the STC in the unit that created modulated MPEG stream 120) generally runs, in one example, at a standard FREQENCODER=27 MHz+/−810 cycles. The frequency of decoder STC 175 is calculated by the formula: FREQDECODER=((PCRT−1)−(PCRT))/(TT−1−TT), where PCRT is the PCR recovered at local time TT, PCRT−1 is the PCR recovered at local time TT−1. If FREQDECODER differs from the prescribed 27 MHz+/−810 cycles then receiver 100 is inherently in an out of AVsync condition because clock all operations of decoding and presentation of audio units and video frames will be performed in a different time relationship than that used when the audio and video were encoded. To this end, MPEG stream de-multiplexer and decryptor 130 is provided with a frequency extractor module 195, which sends time stamped frequency data 200 to storage subsystem 180.

The second measure of AVsync is the difference (_dta) between a recovered audio DTS and an actual audio decoding time (LTSAD), which may be expressed as _dta=DTS−LTSAD. The third measure of AVsync is the difference (_pta) between a recovered audio PTS and an actual audio presentation time (LTSAP), which may be expressed as _dpa=PTS−LTSAP. DTS's and PTS's are recovered from the PTS/DTS field of the MPEG PES illustrated in FIG. 3. For perfect AVsync _dta and _pta are equal to zero. If _dta is not equal to zero then decode of audio units is not being performed to the same timing relationship as encode of those audio units was performed in the encoder. If _pta is not equal to zero then presentation of audio units in receiver 100 is not being performed in the same timing relationship as when the audio units were presented for encode in the encoder. To this end, audio decoder 150 is provided with an audio delta calculator module 205, which sends time stamped _dta's and _pta's (signal 210) to storage subsystem 180.

The fourth measure of AVsync is the difference (_dtv) between a recovered video DTS and an actual video decoding time (LTSVD), which may be expressed as _dtv=DTS−LTSvD. The fifth measure of AVsync is the difference (_ptv) between a recovered video PTS and an actual video presentation time (LTSVP), which may be expressed as _dpva=PTS−LTSVP. DTS's and PTS's are recovered from the PTS/DTS field of the MPEG PES illustrated in FIG. 3. For perfect AVsync, _dtv and _ptv are equal to zero. If _dtv is not equal to zero then decode of video units (generally frames) is not being performed to the same timing relationship as encode of those video units was performed in the encoder. If _ptv is not equal to zero then presentation of video units in receiver 100 is not being performed in the same timing relationship as when the video units were presented for encode in the encoder. To this end, video decoder 160 is provided with a video delta calculator module 215, which sends time stamped _dtv's and _ptv's (signal 220) to storage subsystem 180.

FREQDECODER's, _dta's, _pta's, _dtv's and _ptv's along with the LTS time stamp are collected in a table 225 within storage subsystem 180. In operation, during the testing of receiver 100, known good MPEG stream is presented to the receiver and FREQDECODER's, _dta's, _pta's, _dtv's and _ ptv's are sampled periodically and added to table 225. This is performed without any operator intervention and may be performed over as short a period of time or over as long a period of time as desired and performed using as many different MPEG streams are desired. At the end of testing, table 225 is downloaded to computer 230 and analysis of the LTS,s, FREQDECODER's, _dta's, _pta's, _dtv's and _ptv's performed.

In an alternative embodiment, storage subsystem 180 resides within computer 230 instead of within receiver system 100.

Testing, tests both the hardware and software of receiver 100. Any errors detected in hardware or software can then be fixed and additional testing performed until desired test results are obtained. Frequency extractor 195, audio delta calculator module 205 and video delta calculator module 215 are generally implemented in software and then only in the test version of the software loaded onto receiver 100. Frequency extractor 195, audio delta calculator module 205 and video delta calculator module 215 are generally not present within the software shipped with production hardware. Because there is no human intervention, testing is more though, more accurate and more precise than hereto has been obtained by conventional testing means.

Figure 5:
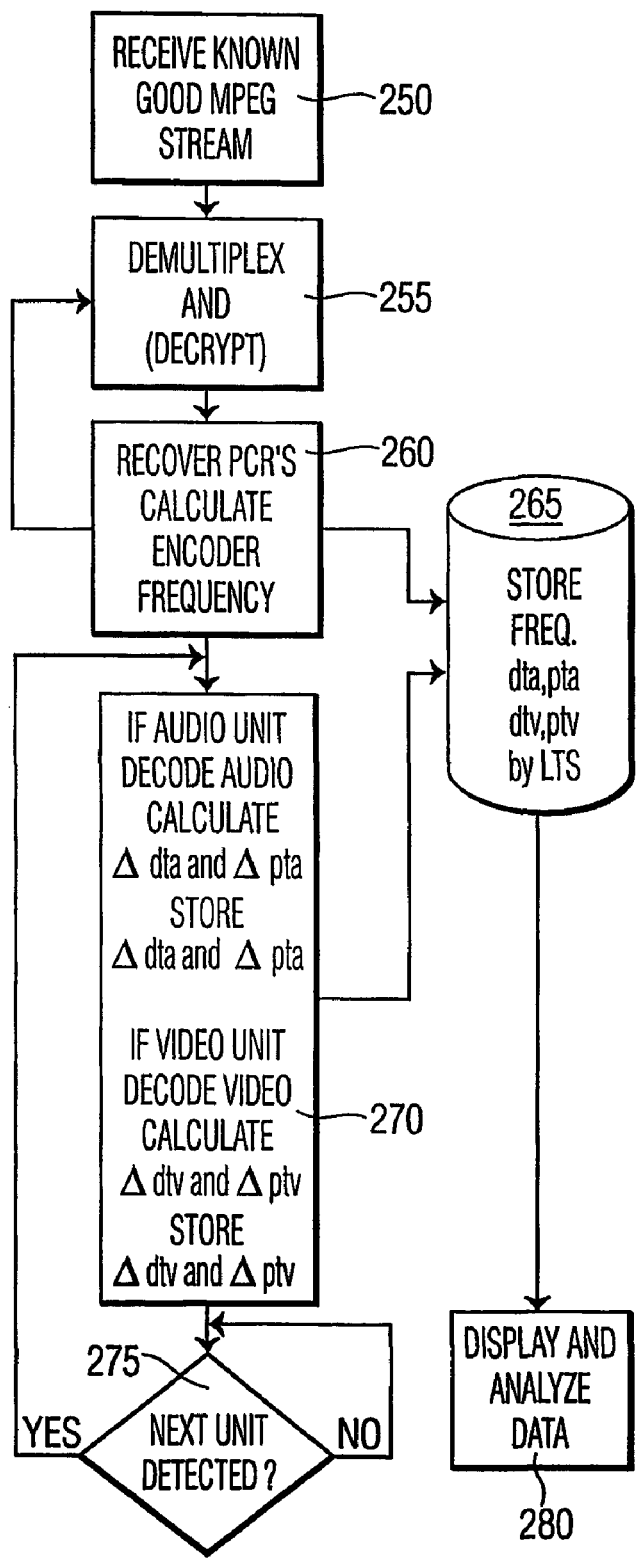
FIG. 5 is a flowchart of a first embodiment of the present invention.

FIG. 5 is a flowchart of a first embodiment of the present invention. In step 250, a known good MPEG stream is received. A known good MPEG stream is at one level, a stream that is MPEG compliant, and on another level is a stream known to produce FREQDECODER's=27 KHz+/−810 cycle, _dta's=0, _pta's=0, _dtv's=0 and _ptv's=0 on a test system as illustrated in FIG. 4 and described supra. FREQDECODER need not be exactly equal to 27 MHz+/−810 cycles, but sufficiently close so the presented audio and video signals are perceived by a viewer not to be out of synchronization. Likewise the _dta's, _pta's, _dtv's and _ ptv's need not be exactly zero, but sufficiently close enough to zero so the presented audio and video signals are perceived by a viewer not to be out of synchronization.

In step 255 the MPEG stream is de-multiplexed and optionally decrypted. In step 260, the PCRs from the MPEG transport stream are recovered and the encoder frequency FREQDECODER calculated as described supra. The calculated frequency, along with the local time (receiver time) is stored in step 265. Steps 255, 260 and 265 continuously repeat every time a new PCR is detected.

In step 270, in the case of an audio unit, values for _dta and _pta are calculated as described supra in reference to FIG. 4, and the _dta and _pta values, along with the local time (receiver time) are stored in step 265. In the case of a video unit, values for _dtva and _ptv are calculated as described supra in reference to FIG. 4, and the _dtv and _ptv values, along with the local time (receiver time) are stored in step 265. Step 275 creates a delay until the next audio or video unit is detected and then the method loops back to step 270. Audio/video unit detection is accomplished by detection of a PTS/DTS field in the MPEG PES illustrated in FIG. 3. Determination of audio unit or video unit is based upon the PID field of the transport stream illustrated in FIG. 1.

In step 280, the stored and time stamped FREQDECODER, _dta, _pta, _dtv and _ptv values may be reviewed real time, any time during test, or after test is complete. The time stamp allows specific values or time ranges of FREQDECODER, _dta, _pta, _dtv to be related to specific temporal audio and video units, greatly aiding in hardware and software debug for problems, among others, that may be content related.

Figure 6:
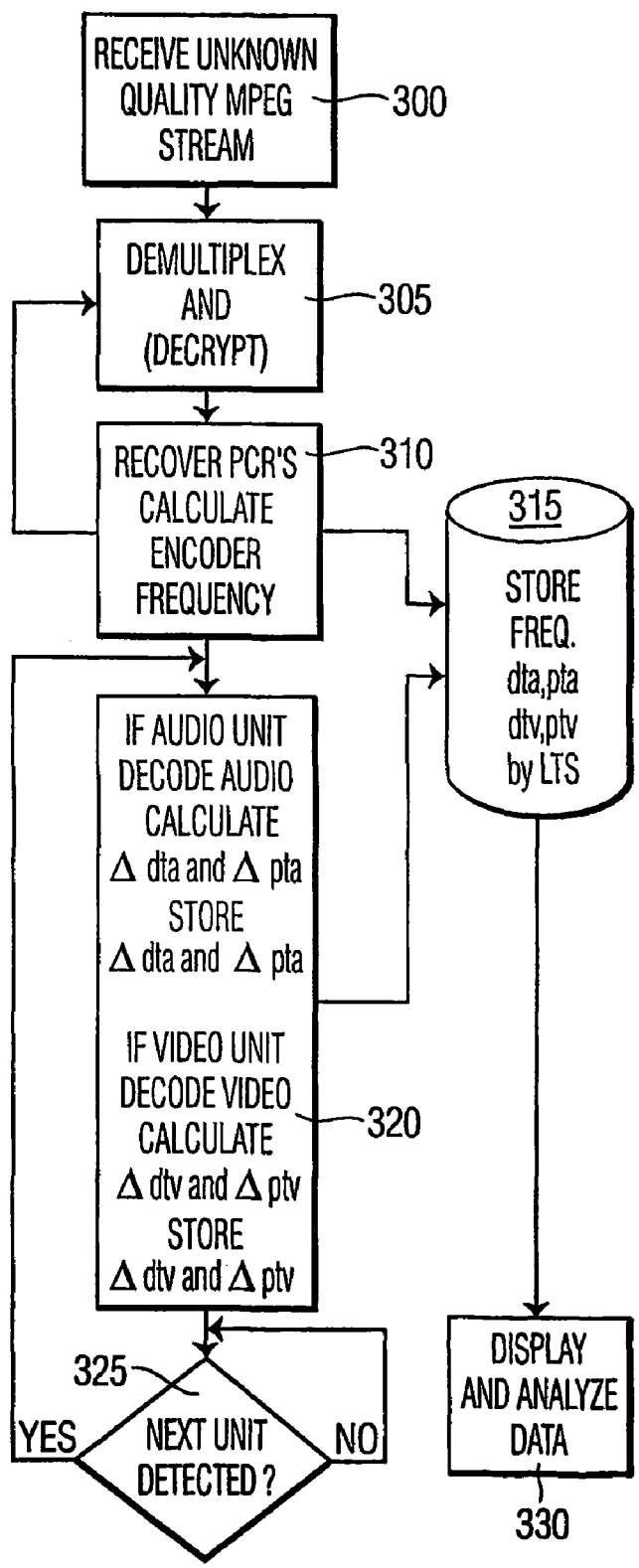
FIG. 6 is a flowchart of a second embodiment of the present invention.

FIG. 6 is a flowchart of a second embodiment of the present invention. The receiver illustrated in FIG. 4 and described supra, may be used to test MPEG streams for compliance to MPEG standards in terms of AVsync. All that is required is a hardware/software combination that is known to be capable of a high degree of AVsync. Therefore, steps 305, 310, 315, 320, 325 and 330 of FIG. 6 are identical to respective steps 250, 255, 260, 265, 270, 275 and 280 of FIG. 5 as described supra. The significant difference is that in step 300 a MPEG stream of unknown AVsync quality is received. In step 330, the stored and time stamped FREQDECODER, _dta, _pta, _dtv and _ptv values may be reviewed real time, any time during test, or after test is complete. The time stamp allows specific values or time ranges of FREQDECODER, _dta, _pta, _dtv to be related to specific temporal audio and video units, greatly aiding determining specific portions of the MPEG stream or audio or video units that are responsible for AVsync problems.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

The invention claimed is:

1. A method of testing audio/video synchronization of a decoder device for receiving a digital stream, said digital stream containing system time clock fields, program clock reference fields, audio decoding time stamp fields, audio presentation time stamp fields, video decoding time stamp fields and video presentation time stamp fields, comprising:

recovering at least two sequential program clock references from said program clock reference fields;
calculating a frequency of a device used to encode said digital stream based on said sequential program clock references and decoder time stamps of when said sequential program clock references were recovered;
generating an audio elementary stream and a video elementary stream from said digital stream;
recovering from said audio elementary stream at least one audio decoding time stamp from said audio decoding time stamp fields and calculating a first time difference between said audio decoding time stamp and a first decoder time stamp of when an audio unit corresponding to said audio decoding time stamp was decoded;
recovering from said audio elementary stream at least one audio presentation time stamp from said audio presentation time stamp fields and calculating a second time difference between said audio presentation time stamp and a second decoder time stamp of when an audio unit corresponding to said audio presentation time stamp was presented;
recovering from said video elementary stream at least one video decoding time stamp from said video decoding time stamp fields and calculating a third time difference between said video decoding time stamp and a third decoder time stamp of when a video frame corresponding to said video decoding time stamp was decoded; and
recovering from said video elementary stream at least one video presentation time stamp from said video presentation time stamp fields and calculating a fourth time difference between said video presentation time stamp and a fourth decoder time stamp of when said a video frame corresponding to said video presentation time stamp was presented.

2. The method of claim 1, further including: storing said calculated frequency, said first time difference, said second time difference, said third time difference and said fourth time difference.

3. The method of claim 2, further including:
storing a decoder time stamp of when said calculated frequency was calculated, said first decoder time stamp, said second decoder time stamp, said third decoder time stamp and said fourth decoder time stamp.

4. The method of claim 3, wherein said storing said calculated frequency, said first time difference, said second time difference, said third time difference and said fourth time difference; and said storing a decoder time stamp of when said calculated frequency was calculated, said first decoder time stamp, said second decoder time stamp, said third decoder time stamp and said fourth decoder time stamp are stored on storage media internal to said decoder device.

5. The method of claim 3, wherein said storing said calculated frequency, said first time difference, said second time difference, said third time difference and said fourth time difference and said storing a decoder time stamp of when said calculated frequency was calculated, said first decoder time stamp, said second decoder time stamp, said third decoder time stamp and said fourth decoder time stamp are stored on storage media external to said decoder device.

6. The method of claim 1, further including:
generating said first, second, third and fourth decoder time stamps based on program clock references recovered from said program clock reference fields of said digital stream.

7. The method of claim 1, further including:
generating said first, second, third and fourth decoder time stamps based on said frequency of said device used to encode said digital stream.

8. The method of claim 1 further including:
comparing said calculated frequency to a known value of said encoder frequency; and
comparing said first time difference to zero, said second time difference to zero, said third time difference to zero and said fourth time difference to zero.

9. A method of testing audio/video synchronization of a decoder device under test, said decoder device receiving a digital stream, said digital stream containing system time clock fields, program clock reference fields, audio decoding time stamp fields, audio presentation time stamp fields, video decoding time stamp fields and video presentation time stamp fields, comprising:
- providing a frequency extractor module in a de-multiplexer of said decoder device, said frequency extractor module adapted to recover at least two sequential program clock references from said program clock reference fields;
- calculating a frequency of a device used to encode said digital stream based on said sequential program clock references and decoder time stamps of when said sequential program clock references were recovered;
- generating an audio elementary stream and a video elementary stream from said digital stream;
- providing an audio delta calculator module in an audio decoder, said audio delta calculator adapted module to recover from said audio elementary stream at least one audio decoding time stamp from said audio decoding time stamp fields and adapted to calculate a first time difference between said audio decoding time stamp and a first decoder time stamp of when an audio unit corresponding to said audio decoding time stamp was decoded and adapted to recover from said audio elementary stream at least one audio presentation time stamp from said audio presentation time stamp fields and adapted to calculate a second time difference between said audio presentation time stamp and a second decoder time stamp of when said audio unit corresponding to said audio presentation time stamp was presented; and
- providing a video delta calculator module, said video delta calculator module adapted to recover from said video elementary stream at least one video decoding time stamp from said video decoding time stamp fields and adapted to calculate a third time difference between said video decoding time stamp and a third decoder time stamp of when a video frame corresponding to said video decoding time stamp was decoded and adapted to recover from said video elementary stream at least one video presentation time stamp from said video presentation time stamp fields and adapted to calculate a fourth time difference between said video presentation time stamp and a fourth decoder time stamp of when said video frame corresponding to said audio presentation time stamp was presented.

10. The method of claim 9, further including:
- storing said calculated frequency, said first time difference, said second time difference, said third time difference and said fourth time difference; and
- storing a decoder time stamp of when said calculated frequency was calculated, said first decoder time stamp, said second decoder time stamp, said third decoder time stamp and said fourth decoder time stamp.

11. The method of claim 9 further including:
- comparing said calculated frequency to a known value of said encoder frequency; and
- comparing said first time difference to a first predetermined value, said second time difference to a second predetermined value, said third time difference to a third predetermined value and said fourth time difference to a fourth predetermined value.

12. The method of claim 11, further including:
- modifying said decoder device in response to said calculated frequency differing from a known value of said encoder frequency by a pre-determined amount; and
- modifying said decoder in response to said first time difference, said second time difference, said third time difference or said fourth time difference differing from respective said first, second, third and fourth predetermined values by respective predetermined first, second, third and fourth amounts.

13. The method of claim 9, further including removing said frequency extractor module, said audio delta calculator module and said video delta calculator module from said decoder device after testing is complete.

14. The method of claim 9, further including:
- generating said first, second, third and fourth decoder time stamps based on program clock references recovered from said program clock reference fields of said digital stream.

15. The method of claim 9, further including:
- generating said first, second, third and fourth decoder time stamps based on said frequency of said device used to encode said digital stream.

* * * * *